(12) United States Patent  
Ressler et al.

(10) Patent No.: US 9,221,402 B2  
(45) Date of Patent: Dec. 29, 2015

(54) BICYCLE RACK

(71) Applicant: Beta Concept Works LLC, West Bend, WI (US)

(72) Inventors: Kyle Ressler, West Bend, WI (US); Jill Mohr, Port Byron, IL (US); John Petersen, Fond du Lac, WI (US)

(73) Assignee: Beta Concept Works LLC, West Bend, WI (US)

( * ) Notice: Subject to any disclaimer, the term of this patent is extended or adjusted under 35 U.S.C. 154(b) by 207 days.

(21) Appl. No.: 13/842,248

(22) Filed: Mar. 15, 2013

(65) Prior Publication Data

US 2014/0076946 A1  Mar. 20, 2014

Related U.S. Application Data

(60) Provisional application No. 61/702,716, filed on Sep. 18, 2012.

(51) Int. Cl.
*B60R 9/10* (2006.01)
*B62H 3/00* (2006.01)

(52) U.S. Cl.
CPC ... *B60R 9/10* (2013.01); *B62H 3/00* (2013.01)

(58) Field of Classification Search
CPC .................................... B60R 9/10; B62H 3/00
USPC ................. 224/926, 319, 321, 323, 324, 325; 211/17–22
See application file for complete search history.

(56) References Cited

U.S. PATENT DOCUMENTS

| | | | | |
|---|---|---|---|---|
| 564,787 A | * | 7/1896 | Hart, Jr. | 211/17 |
| 663,226 A | * | 12/1900 | Hart, Jr. | 211/17 |
| 3,204,839 A | * | 9/1965 | Yuda et al. | 224/324 |
| 3,752,375 A | | 8/1973 | Weigl | |
| 3,828,993 A | | 8/1974 | Carter | |
| 3,847,317 A | * | 11/1974 | Raff et al. | 224/492 |
| 4,629,104 A | * | 12/1986 | Jacquet | 224/324 |
| 4,892,190 A | | 1/1990 | Delgado | |
| 5,509,776 A | | 4/1996 | Specht et al. | |
| 5,690,260 A | | 11/1997 | Aikins | |
| 6,145,720 A | | 11/2000 | Comeau | |
| 6,662,983 B2 | | 12/2003 | Lane | |
| 7,631,854 B1 | | 12/2009 | Mountain | |
| 8,616,424 B2 | * | 12/2013 | Byers et al. | 224/310 |
| 2003/0222191 A1 | * | 12/2003 | Tsai | 248/354.1 |
| 2012/0055967 A1 | | 3/2012 | Mcmillan | |

* cited by examiner

*Primary Examiner* — J. Gregory Pickett
*Assistant Examiner* — Corey Skurdal

(57) ABSTRACT

A bicycle rack is configured to support a bicycle in either a substantially horizontal orientation or in an upright, substantially vertical orientation. The bicycle rack includes pivotally and slidably coupled first and second frame members, and three support assemblies. Each support assembly includes a first support member defining a generally upwardly facing bicycle support surface, and a second support member. The first support members are height adjustable to vary a height of the bicycle support surfaces above the plane, and to provide a three-point bicycle support platform configured to support a bicycle in a substantially horizontal orientation. Each second support member includes a releasable clamp member for supporting a bicycle in an upright, substantially vertical orientation.

21 Claims, 8 Drawing Sheets

BICYCLE RACK

CROSS-REFERENCE TO RELATED APPLICATION

This application claims the benefit of and priority to U.S. Provisional Patent Application No. 61/702,716, filed Sep. 18, 2012, the entire contents of which are hereby incorporated by reference herein.

BACKGROUND

Bicycle racks and bicycle carriers are known for supporting bicycles during storage and transportation. Known styles of bicycle racks include roof-top racks, trunk-supported racks, hitch-supported racks, and the like. Some bicycle racks include elongated channels that receive and support the tires of a bicycle, and a pivoting securement arm that extends upwardly from the channel for securement to a frame tube of the bicycle. Other bicycle racks include cantilevered support arms that include adjustable support blocks that receive one or more frame tubes of the bicycle. Still other bicycle racks include quick-release fork locks for coupling to the front forks of the bicycle after the bicycle's front wheel has been removed.

SUMMARY

In some aspects, a bicycle rack includes a first frame member and a second frame member movably coupled to the first frame member, the first and second frame members substantially residing in a common and substantially horizontal plane. The rack also includes three support assemblies, two of the three support assemblies coupled to the first frame member and a third of the three support assemblies coupled to the second frame member. Each support assembly supports a respective upwardly facing support surface in a manner that permits adjustment of a relative height of at least one of the support surfaces above the horizontal plane to provide a three-point support platform configured to support a bicycle in a substantially horizontal orientation.

Each support assembly may include a base portion that may support the first and second frame members in the substantially horizontal plane. Each support assembly may be moveable along its respective frame member in a direction substantially parallel to a longitudinal extent of the respective frame member. Each support assembly may include a coupling assembly for adjustably coupling the support assembly to its respective frame member. Each coupling assembly may include a latching member that is adjustable between a latched position that may restrict movement of the support assembly along its respective frame member, and an unlatched position that may permit movement of the support assembly along its respective frame member. Each support assembly may include a support member that defines the support surface, and each support member may be height adjustable along an axis that is substantially perpendicular to the substantially horizontal plane. Each support assembly may include a coupling assembly adjustably supporting the support member. Each coupling assembly may include a latching member that may be adjustable between a latched position that may restrict movement of the support member relative to the substantially horizontal plane, and an unlatched position that may permit movement of the support assembly relative to the substantially horizontal plane. Each support assembly may include a support member. Each support member may include a substantially X-shaped support platform that may define the respective support surface and that may include a plurality of attachment locations. Each support member may also include an attachment member releasably securable to the attachment locations and configured to secure the bicycle to the respective support member. At least one of the support assemblies may include a transversely extending support member defining an axis that is substantially parallel to the substantially horizontal plane. The support member may include a clamp member and may be configured to support a bicycle in an upright, substantially vertical orientation. The support member may include a fork clamp configured for releasable engagement with a lower end of a bicycle fork.

In other aspects, a bicycle rack includes a first frame member defining a first axis and a second frame member movably coupled to the first frame member and defining a second axis. The first and second axes define a plane. The rack also includes three first support members, with two of the three first support members coupled to the first frame member and a third of the three support members coupled to the second frame member. Each support member may include an upwardly facing bicycle support surface that is moveable to adjust a height of the support surface above the plane. The three support surfaces cooperate to provide a three-point bicycle support platform configured to support a bicycle in a substantially horizontal orientation. At least one second support member is coupled to one of the first and second frame members and is configured for engagement with an end of a bicycle to support the bicycle in an upright, substantially vertical orientation.

The at least one second support member may include a fork clamp. The rack may also include three support assemblies, with each support assembly including a first coupling assembly coupling the support assembly to one of the first frame member and the second frame member, and a second coupling assembly adjustably coupling a respective one of the first support members to the support assembly. Each first coupling assembly may selectively restrict and permit movement of its respective support assembly in a direction substantially parallel to a longitudinal extent of the respective first or second frame member. Each second coupling assembly may selectively restrict and permit movement of its respective first support member to adjust the height of the respective support surface. Each support assembly may include a base, and the bases may cooperate to support the first frame member and the second frame member. The at least one second support member may be fixed to a respective one of the three support assemblies. The at least one second support member may include three second support members, and each second support member may be fixed to a respective one of the three support assemblies.

In still other aspects, a bicycle rack is configured to support a bicycle in either a substantially horizontal orientation or in an upright, substantially vertical orientation. The bicycle rack includes a first frame member defining a first axis and a second frame member pivotally and slidably coupled to the first frame member and defining a second axis. The first and second axes cooperate to define a plane. The bicycle rack also includes three support assemblies, with two of the three support assemblies coupled to the first frame member and one of the three support assemblies coupled to the second frame member. Each support assembly includes a first coupling assembly slidably coupling the support assembly to its respective first or second frame member for movement along the respective first or second frame member. Each support assembly also includes a second coupling assembly. The rack also includes three first support members. Each first support member is moveably coupled to a respective support assembly by a respective second coupling assembly. Each support member defines a generally upwardly facing bicycle support surface and is adjustable to vary a height of the bicycle support surface above the plane. The bicycle support surfaces cooperate to provide a three-point bicycle support platform configured to support a bicycle in a substantially horizontal orientation. The rack also includes three second support members. Each second support member is fixed to a respective one of the three support assemblies and is moveable therewith along the respective first or second frame member. Each second support member includes a releasable clamp member for supporting a bicycle in an upright, substantially vertical orientation.

Each first support member may include a substantially X-shaped support platform that may define the respective bicycle support surface, and that may include a plurality of attachment locations. Each first support member may also include an attachment member releasably securable to the attachment locations and configured to secure the bicycle to the respective first support member. Each support assembly may include a base, and the bases may cooperate to support the first and second frame members.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
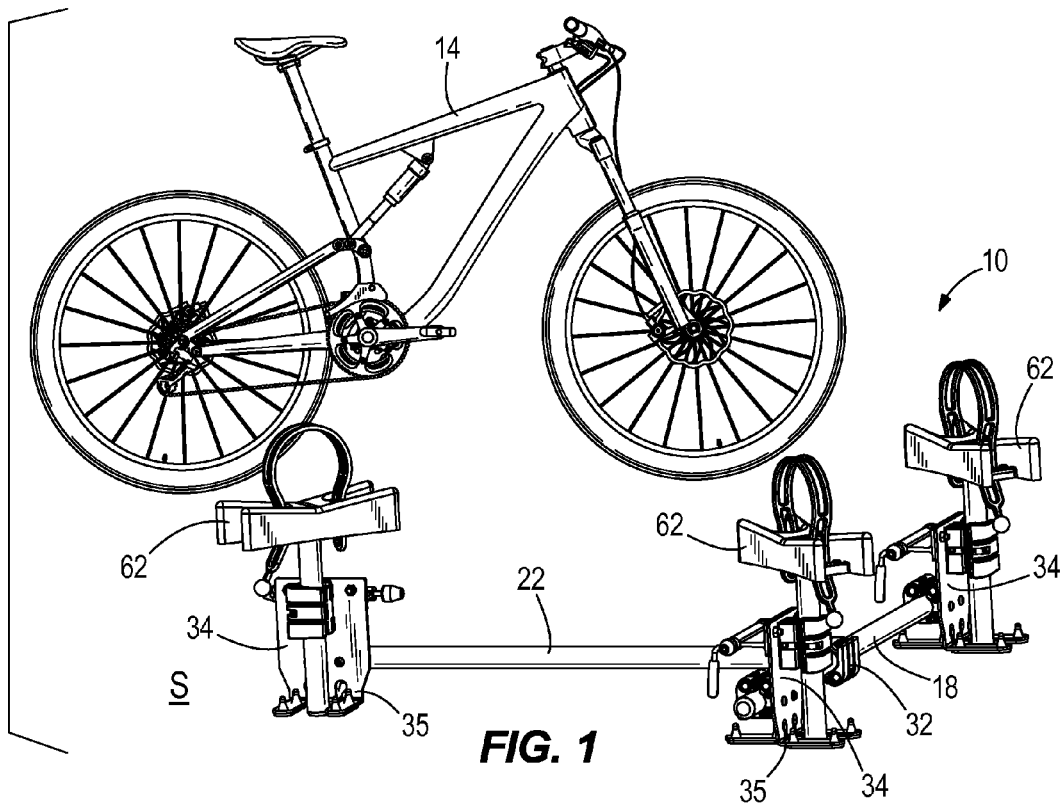
FIG. 1 is perspective view of a bicycle and a multi-configuration bicycle rack.
Figure 2:
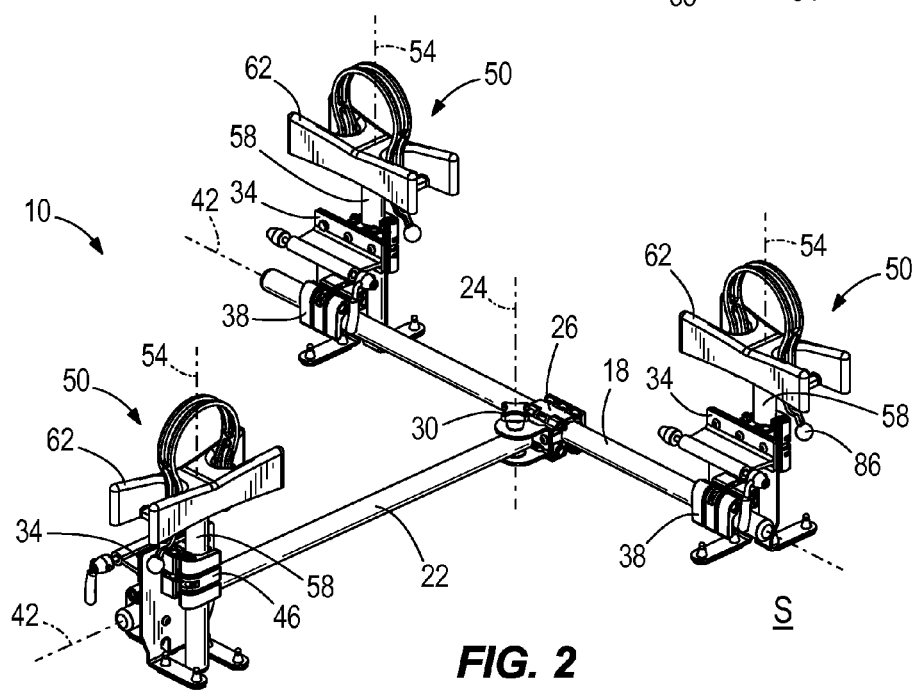
FIG. 2 is perspective view of the bicycle rack of FIG. 1.
Figure 4:
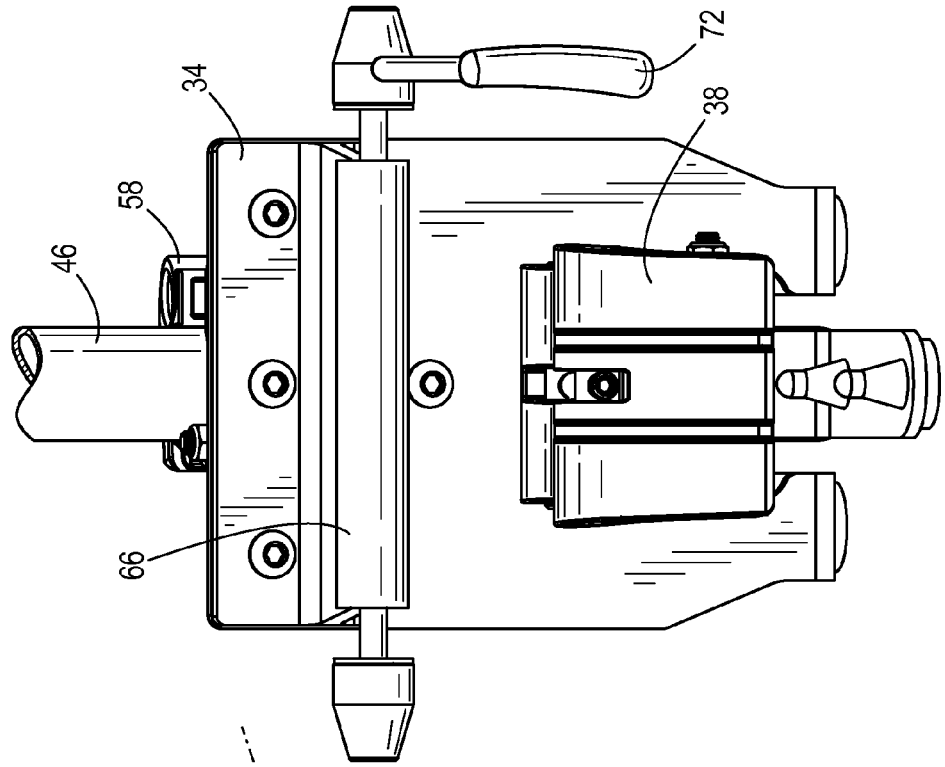
FIG. 4 is a front view of the support assembly of FIG. 3
Figure 3:
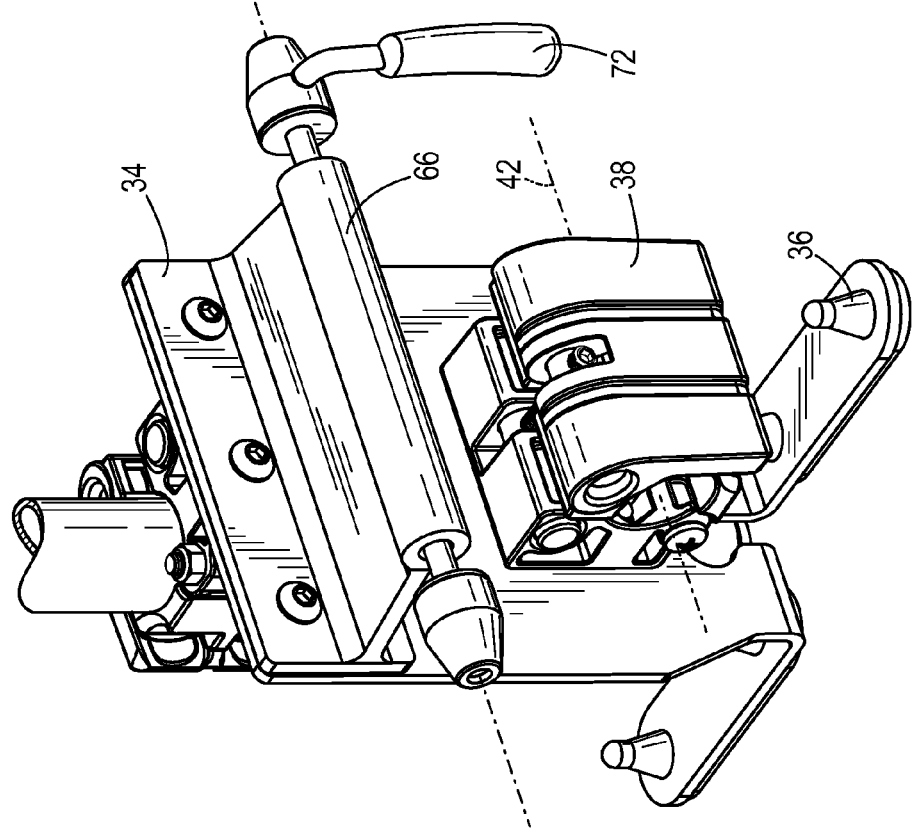
FIG. 3 is a perspective view of a support assembly of the bicycle rack of FIG. 1.

FIGS. 1 and 2 illustrate a bicycle rack 10 for supporting a bicycle 14. The illustrated bicycle rack 10 is configured to support the bicycle 14 in either an upright, substantially vertical orientation, or in a flat, substantially horizontal orientation. The rack 10 includes a first elongated frame member 18 and a second elongated frame member 22 movably, for example pivotally, coupled to the first frame member 18 by way of a coupling 26. In the illustrated embodiment, the second frame member 22 pivots with respect to the first frame member 18 about a pivot axis 24 that is substantially perpendicular to a support surface S such as the ground, an interior surface of a vehicle, or the like. The illustrated first and second frame members 18, 22 are in the form of elongated, generally cylindrical tubes, although other configurations and arrangements are also possible. The pivot coupling 26 is adjustable to selectively restrict and permit pivotal movement of the second frame member 22 with respect to the first frame member 18. The pivot coupling 26 is also adjustable to selectively restrict and permit sliding movement of the pivot coupling 26 along the first frame member 18 to adjust a location of the pivot coupling 26 along the first frame member 18. In the illustrated embodiment the pivot coupling 26 includes a pivot portion having an adjustor in the form of an adjustment knob 30 that can be tightened and loosened to restrict and permit, respectively, pivoting movement of the second frame member 22 with respect to the first frame member 18. The illustrated pivot coupling 26 also includes a body portion that includes a latching member 32 that is adjustable to selectively restrict and permit sliding movement of the pivot coupling 26 along the first frame member 18. In the illustrated embodiment the latching member 32 is an over-center latching mechanism that is moveable between a latched position and a released position to restricted and permit, respectively, movement of the pivot coupling 26 along the first frame member 18. In other embodiments, alternative types of adjustment and selective latching or locking devices may be used. In still other embodiments, pivotal movement of the second frame member 22 and sliding movement of the pivot coupling 26 with respect to the first frame member 18 may be selectively restricted or permitted by a common adjustment device.

Referring also to FIGS. 2-6, the rack 10 includes a plurality (e.g., three in the illustrated embodiment) of support assemblies 34. Each support assembly 34 is adjustably coupled to one of the first and second frame members 18, 22. In the illustrated embodiment, each support assembly 34 includes a base portion 35 engageable with the support surface S. The base portion 35 may include a plurality of feet 36 formed of a slip-resistant material to reduce slipping of the support assemblies 34 and thus of the rack 10 with respect to the support surface S. Each support assembly 34 also includes a first coupling assembly 38 for adjustably coupling the support assembly 34 to its respective frame member 18, 22. In the illustrated embodiment, the first coupling assembly 38 includes an over-center latching member that is adjustable between a latched position and an unlatched position to selectively restrict and permit, respectively, sliding movement of the support assembly 34 along the respective first or second frame member 18, 22. The first coupling assembly 38 may therefore selectively restrict and permit movement of the support assembly 34 in a direction substantially parallel to a longitudinal extent of the respective first or second frame member 18, 22. In some embodiments, including the illustrated embodiment, when the first coupling assembly 38 is in the unlatched position the support assembly 34 is moveable along a first axis 42 defined by the respective first or second frame member 18, 22. The support assembly 34 may also be rotatable with respect to the respective first or second frame member 18, 22, for example to accommodate irregularities in the support surface S. When the bases 35 of each support assembly 34 are engaged with the support surface S, the first and second frame members 18, 22 are supported above the support surface S by the support assemblies 34.

Each support assembly 34 also includes a second coupling assembly 46 for adjustably supporting a generally upwardly-extending first support member 50. In the illustrated embodiment the second coupling assembly 46 is similar to the first coupling assembly 38 and includes an over-center latching member that is adjustable between a latched position and an unlatched position to selectively restrict and permit sliding and rotatable movement of the first support member 50. The second coupling assembly 46 is oriented such that sliding adjustment of the first support member 50 is in a direction substantially perpendicular to the first axis 42. In this regard, the first support member 50 defines a second axis 54 that is substantially perpendicular to the first axis 42 and that is also generally perpendicular to the support surface S when the rack 10 is positioned on the support surface. In the illustrated embodiment, the first support member 50 includes a tube 58 that extends through and is selectively secured by the second coupling assembly 46. The first support member also includes a bicycle-engaging support platform 62 coupled to an end of the tube 58. When the second coupling assembly 46 is in the unlatched position, the support member 50 is moveable with respect to the second coupling assembly to adjust a height and a rotational orientation of the support platform 62 for supporting the bicycle 14 in the flat, substantially horizontal orientation, as discussed further below.

Each support assembly 34 further includes a transversely extending second support member 66 that, in the illustrated embodiment, is generally fixed with respect to the support assembly 34. The illustrated second support member 66 is configured for engagement with the lower end of a bicycle fork 70 (see FIGS. 5 and 6) when the front wheel of the bicycle 14 has been removed. In this regard, the second support member 66 may include a quick-release fork clamp having a fixed central tube and a pair of clamp members that are movable toward and away from the ends of the central tube in response to movement of an adjustable handle 72 to clamp and unclamp the bicycle fork 70. In other embodiments, the second support member 66 may be or include a channel that receives and supports the tire of the bicycle. In the illustrated configuration, the second support member 66 is oriented such that a third axis 74 defined by the second support member 66 is substantially perpendicular to the second axis 54 defined by the first support member 50. When the bicycle fork 70 is clamped in the second support member 66, the support assembly 34 supports the front end of the bicycle 14 and the rear end of the bicycle is supported by the rear wheel, which remains attached to the bicycle 14 and engages the support surface S. In addition, one or both of the first and second frame members 18, 22, may extend laterally away from the second support member 66 and function to stabilize and support the bicycle in the upright, substantially vertical orientation.

Figure 5:
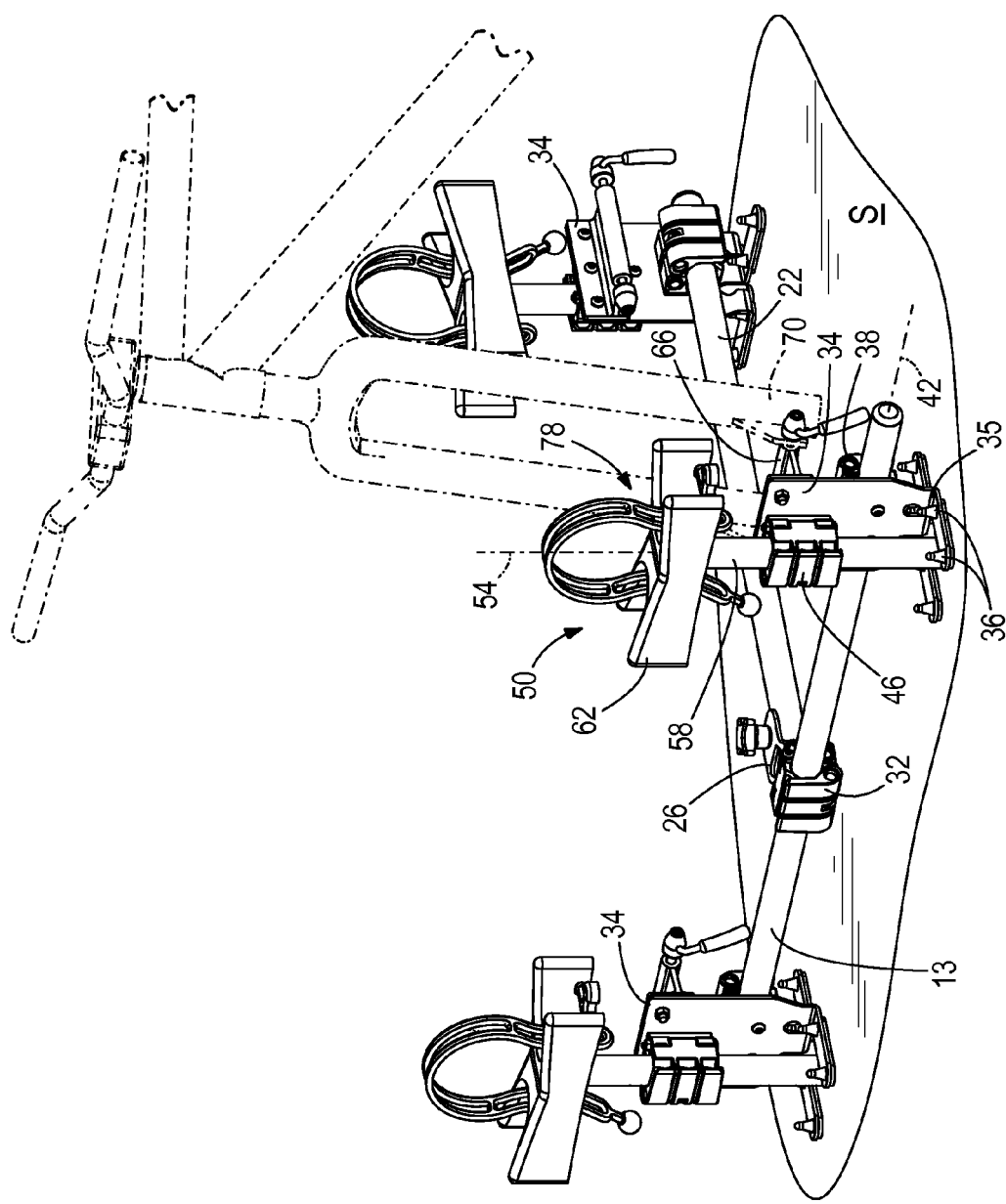
FIG. 5 is a perspective view showing a bicycle supported by a second support member of the bicycle rack of FIG. 1 in an upright orientation.
Figure 6:
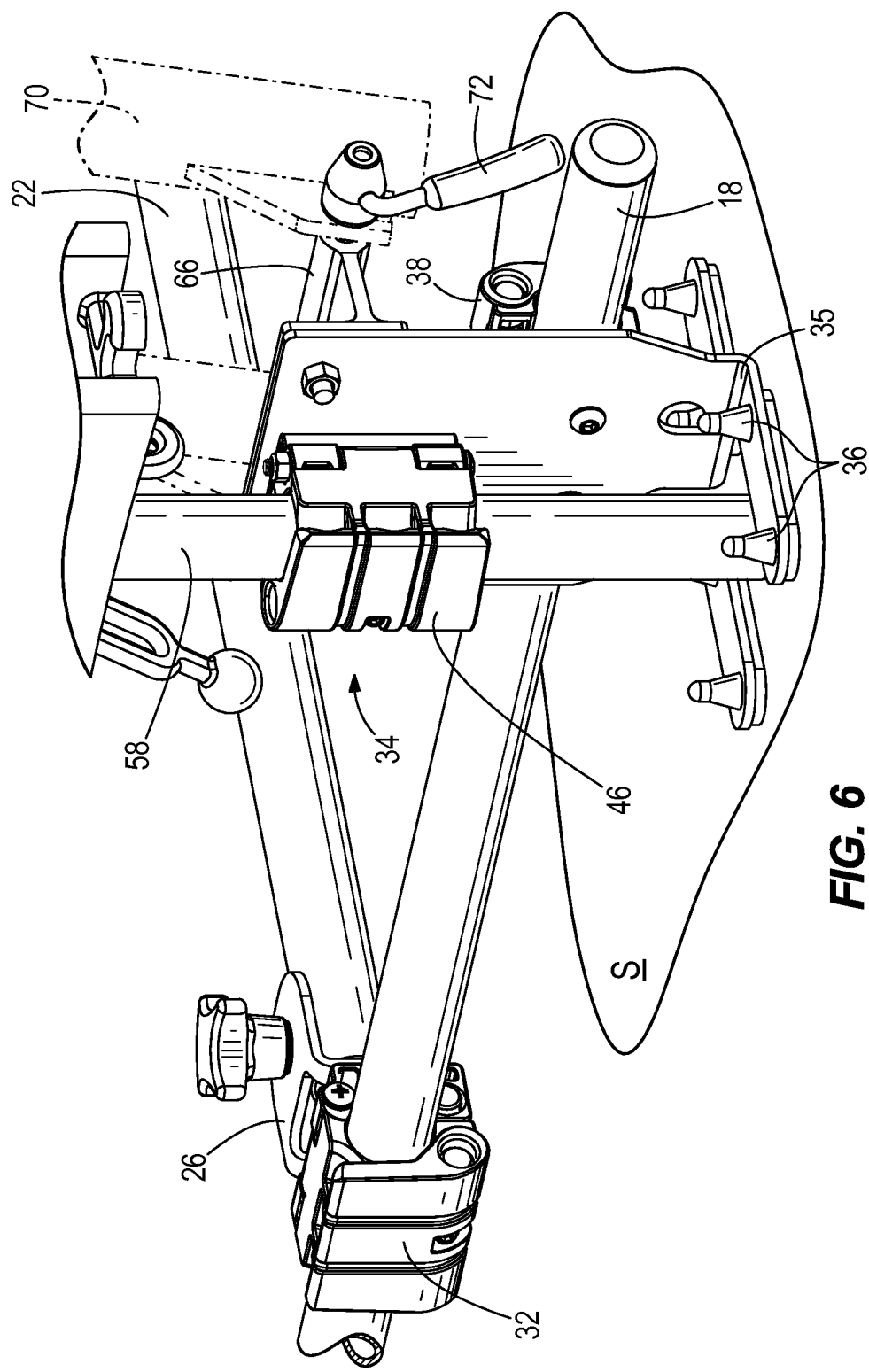
FIG. 6 is an enlarged perspective view similar to FIG. 5.
Figure 7:
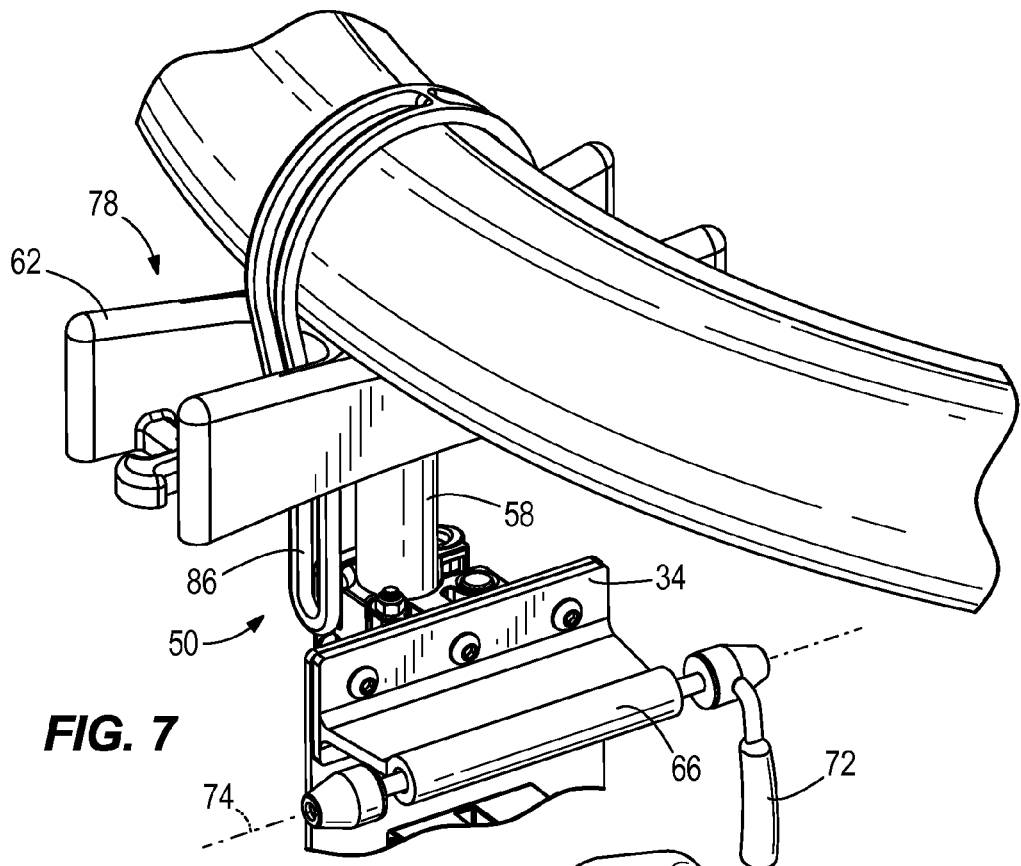
FIG. 7 is a front view showing a rear wheel of a bicycle supported on a first support member of one of the support assemblies of FIG. 3.
Figure 8:
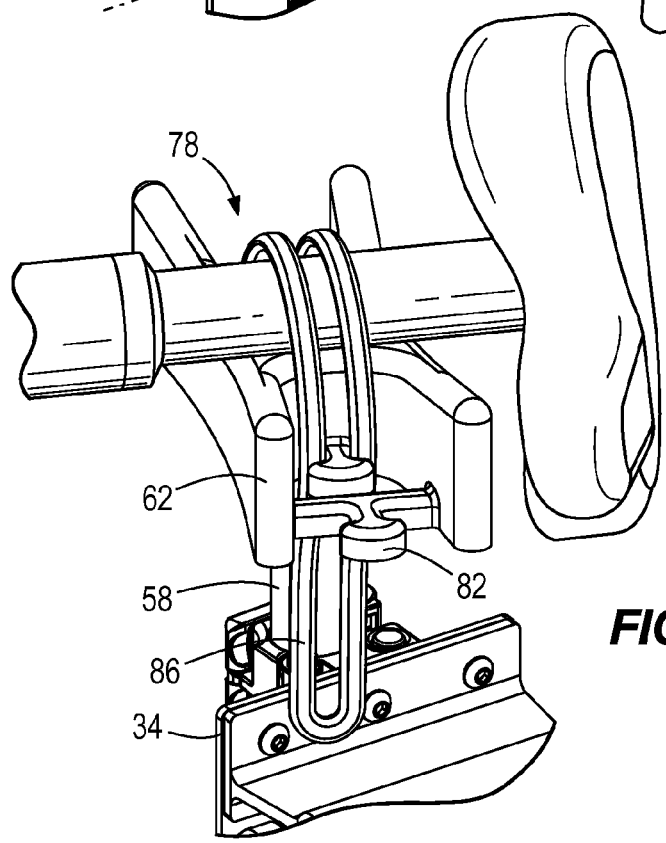
FIG. 8 is a side view of the first support member of FIG. 7.
Figure 9:
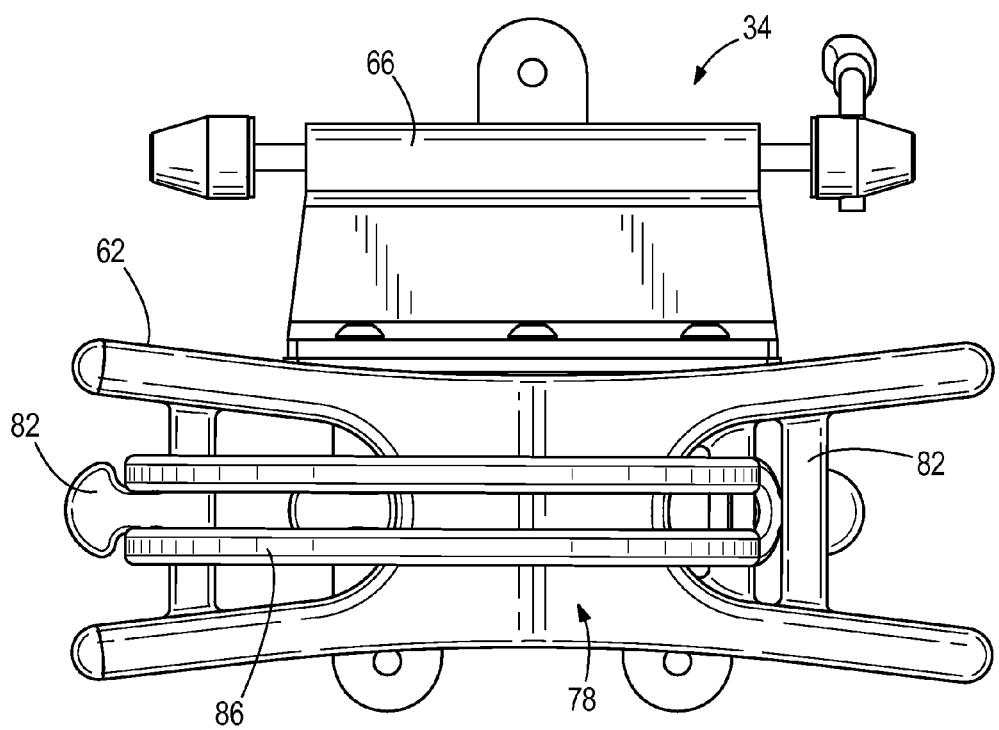
FIG. 9 is a top view of the first support member of FIG. 7.
Figure 10:
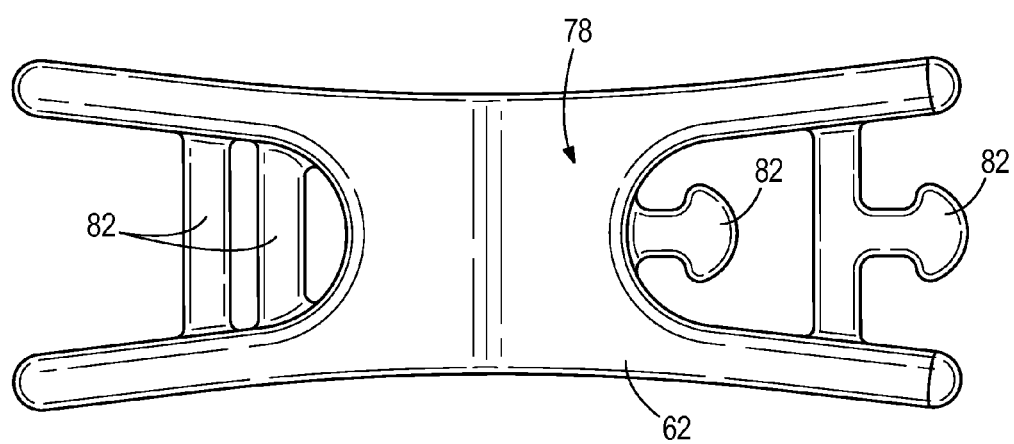
FIG. 10 is a top view of a support platform of the first support member of FIG. 7.

Referring also to FIGS. 7-11, the support platforms 62 are configured and adapted to support the bicycle 14 in the flat, substantially horizontal orientation. Each platform 62 is formed of a non-marring material or combination of materials, such as a suitable plastic, that is rigid enough to support the bicycle 14 but that has little capacity to scratch, dent, or otherwise damage the various components of the bicycle 14, such as the wheels and frame. In the illustrated embodiment each support platform 62 is substantially X-shaped and provides a generally upwardly-facing support surface 78 for supporting the bicycle. As shown in FIGS. 5, 7, and 8, the support surface 78 can be configured to be somewhat concave to improve the overall stability of the portion of the bicycle that is supported by the support surface 78. Each support platform 62 also includes a plurality of attachment locations 82, 84 for securing a resilient attachment member 86 around the portion of the bicycle supported by the support surface 78. In the illustrated embodiment each support platform 62 includes an attachment location 82 in the form of a slot through which the attachment member 86 can be extended, and two attachment locations 84 in the form of cleats to which the attachment member 86 can be secured. The illustrated attachment members 86 are resilient rubber straps that can be adjustably secured to the attachment members 86 in a variety of configurations to secure the bicycle 14 to the support platform 62.

Figure 11:
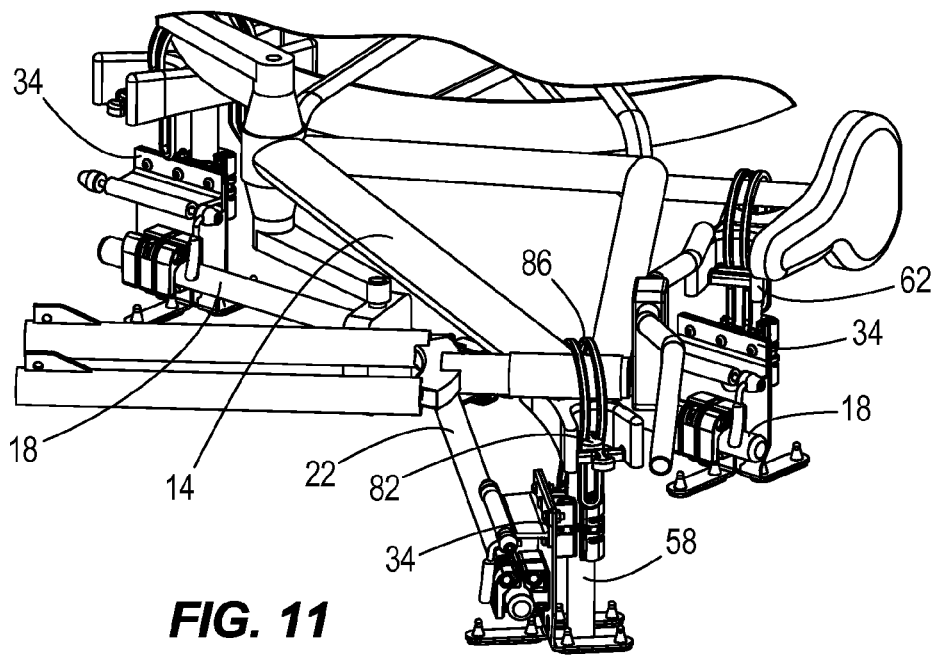
FIG. 11 is a perspective view showing a steering stem area of a bicycle supported on a first support member of one of the support assemblies of FIG. 3.
Figure 12:
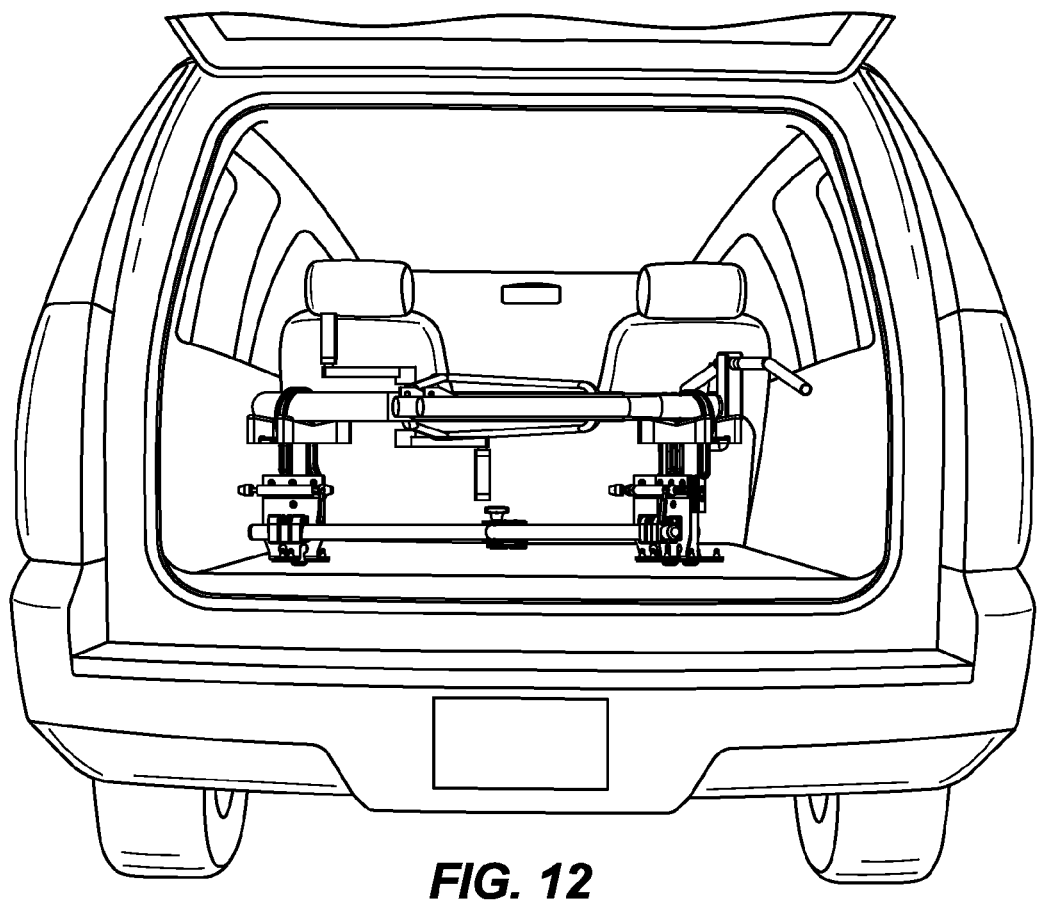
FIG. 12 is a view showing the bicycle rack of FIG. 1 and a bicycle supported thereon in a generally horizontal orientation positioned for transportation in the rear of a vehicle.
Figure 13:
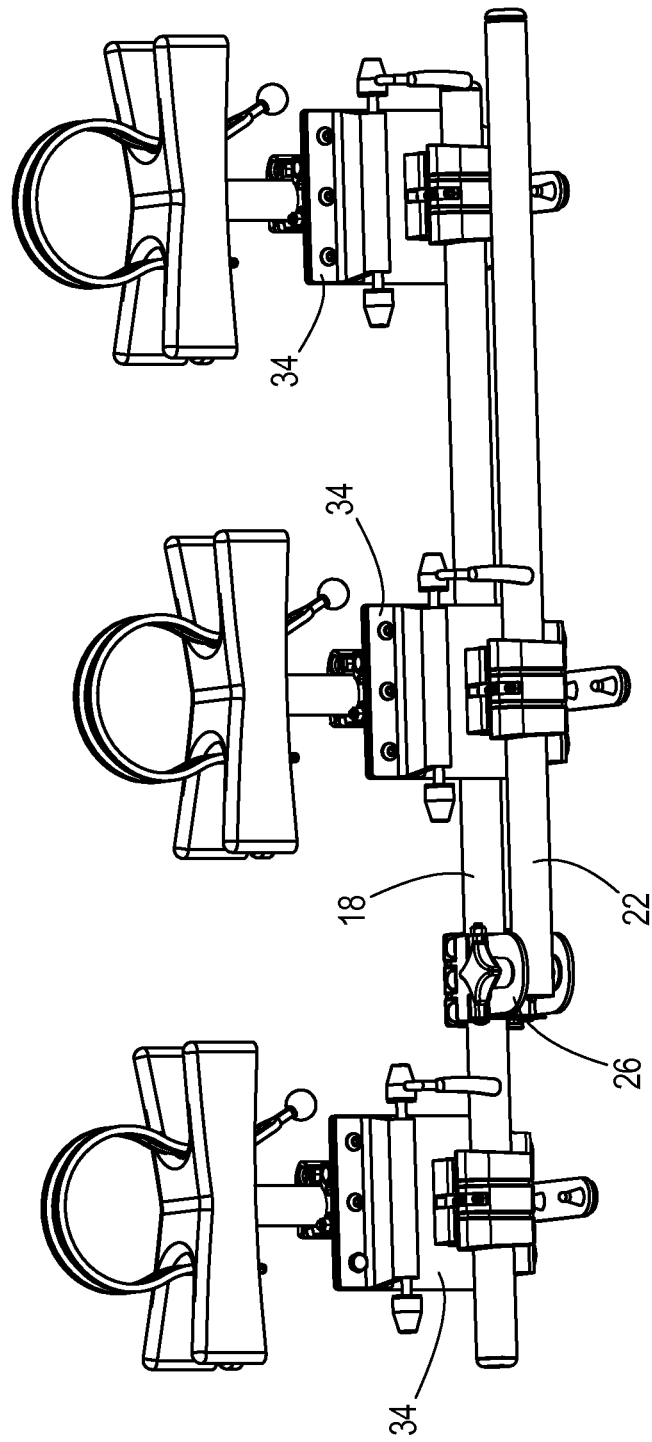
FIG. 13 is a perspective view of the bicycle rack of FIG. 1 configured for supporting three bicycles in generally upright orientations.

The illustrated rack 10 is adapted to support one, two, or three bicycles 14 in upright, substantially vertical orientations, as shown in FIG. 5, or a single bicycle 14 in a flat, substantially horizontal orientation, as shown in FIGS. 11 and 12. To support a bicycle 14 in an upright orientation, the front wheel of the bicycle is removed and the lower end of the bicycle fork 70 is clamped into the second support member 66 of one of the support assemblies 34. As shown, the relative locations of the first support member 50 and the second support member 66 are such that most bicycle forks 70 can be clamped into the second support member 66 generally without removing or adjusting the location of the first support member 50. When supporting a single bicycle 14 the bicycle fork 70 can be clamped into the second support member 66 of any one of the three support assemblies 34. When supporting two bicycles 14, the bicycle forks 70 of the two bicycles 14 generally, but not necessarily, will be clamped into the second support members 66 of the two support assemblies 34 that are coupled to the first frame member 18. The user can adjust the spacing between the two support assemblies 34 coupled to the first frame member 18 as needed by unlatching the first coupling assembly 38 and sliding the respective support assembly 34 along the first frame member 18 as desired. To support three bicycles 14, the second frame member 22 is pivoted relative to the first frame member 18 into a position whereby the second frame member 22 is substantially parallel to the first frame member 18, as shown in FIG. 13. The relative locations of the pivot coupling 26 and the support assemblies 34 along their respective first and second frame members 18, 22 can then be adjusted to achieve the desired spacing between the support assemblies 34. Because the support assemblies 34 are moveable along and removable from the first and second frame members 22, the support assemblies 34 can be oriented and reoriented in any way such that the bicycles are facing all in the same direction or in different directions, as desired to fit within a particular space.

To support a bicycle in the flat, generally horizontal configuration, the angular orientation of the second frame member 22 with respect to the first frame member 18, the location of each support assembly 34 along its respective first or second frame member 18, 22, and the individual heights of the support platforms 50, may be adjusted to position the three support surfaces 78 for supporting the bicycle 14 at three spaced apart locations. Depending on the dimensions of the bicycle, the front wheel may or may not be removed. The adjustability provided by the combination of the pivot coupling 26, the first coupling assembly 38, and the second coupling assembly 46, which allows the support surfaces 78 to be positioned at a variety of relative locations and heights, allows the rack 10 to accommodate bicycles having a wide variety of shapes, sizes, and configurations. By adjusting the relative locations of the support platforms 62, the support platforms 62 can be arranged to cooperatively provide a three-point support platform for supporting the bicycle 14 in the substantially horizontal orientation above the support surface S.

By way of example only, as shown in FIG. 11, the support assembly 34 that is coupled to the second frame member 22 can be positioned to support a steering stem area of the bicycle 14, one of the support assemblies 34 coupled to the first frame member 18 can be positioned to support a seat or seat post area of the bicycle 14, and the other of the support assemblies 34 coupled to the first frame member 18 can be positioned to support the rear wheel of the bicycle 14. Once the bicycle 14 is positioned on the support surfaces 78, the resilient attachment members 86 can be appropriately extended over or around the various portions of the bicycle in contact with the support surfaces 78 and attached to the attachment locations 82 to secure the bicycle 14 to the rack 10. With the bicycle 14 secured to the rack 10, both the bicycle 14 and the rack 10 can be lifted together as a unit. In this way, the bicycle 14 can be secured to the rack 10 outside of a vehicle, for example on the ground, and then the bicycle 14 and the rack 10 can be moved together as a unit into the rear of the vehicle, as shown in FIG. 12.

Various features and advantages of the invention are set forth in the following claims.

What is claimed is:

1. A bicycle rack for supporting a bicycle in a substantially horizontal orientation, the bicycle including a steering stem area, a seat post area, and a rear wheel area, the bicycle rack comprising:
   a substantially horizontally oriented first frame member;
   a substantially horizontally oriented second frame member movably coupled to the first frame member for longitudinal movement along the first frame member and pivotal movement relative to the first frame member about a substantially vertical axis;
   three support assemblies coupled to the first and second frame members, each support assembly supporting a respective upwardly facing support surface in a manner that permits adjustment of a relative height of at least one of the support surfaces with respect to the other support surfaces, the support surfaces including a steering stem area support surface directly engageable with the steering stem area of the bicycle, a seat post area support surface directly engageable with the seat post area of the bicycle, and a rear wheel area support surface directly engageable with the rear wheel area of the bicycle, the steering stem area support surface, the seat post area support surface, and the rear wheel area support surface cooperating to provide a three-point support platform configured to support the bicycle in a substantially horizontal orientation.

2. The bicycle rack of claim 1, wherein each support assembly includes a base portion engageable with a substantially horizontal support surface, and wherein the base portions cooperate to support the first and second frame members.

3. The bicycle rack of claim 2, wherein each support assembly is moveable along its respective frame member in a direction substantially parallel to a longitudinal extent of the respective frame member.

4. The bicycle rack of claim 3, wherein each support assembly includes a coupling assembly for adjustably coupling the support assembly to its respective frame member, each coupling assembly including a latching member that is adjustable between a latched position that restricts movement of the support assembly along its respective frame member, and an unlatched position that permits movement of the support assembly along its respective frame member.

5. The bicycle rack of claim 1, wherein each support assembly includes a support member that defines the support surface, and wherein each support member is height adjustable.

6. The bicycle rack of claim 5, wherein each support assembly includes a coupling assembly adjustably supporting the support member, each coupling assembly including a latching member that is adjustable between a latched position that restricts height adjustment of the support member, and an unlatched position that permits height adjustment of the support member.

7. The bicycle rack of claim 1, wherein each support assembly includes a support member, each support member including a substantially X-shaped support platform that defines the respective support surface and that includes a plurality of attachment locations, each support member further including an attachment member releasably securable to the attachment locations and configured to secure the bicycle to the respective support member.

8. The bicycle rack of claim 1, wherein at least one of the support assemblies includes a transversely extending support member defining an axis that is substantially parallel to a longitudinal extend of a respective frame member to which the at least one support assembly is coupled, the support member including a clamp member and configured to support the bicycle in an upright, substantially vertical orientation.

9. The bicycle rack of claim 8, wherein the bicycle includes a fork lower end and wherein the clamp member includes a fork clamp configured for releasable engagement with the fork lower end for supporting the bicycle in the upright, substantially vertical orientation.

10. The bicycle rack of claim 1, wherein two of the three support assemblies are coupled to the first frame member, and a third of the three support assemblies is coupled to the second frame member.

11. A bicycle rack for supporting a bicycle in a substantially horizontal orientation or in a substantially vertical orientation, with respect to a substantially horizontal support surface, the bicycle including a steering stem area, a seat post area, and a rear wheel area, the bicycle rack comprising:
    a first frame member;
    a second frame member movably coupled to the first frame member;
    three bases, each base coupled to one of the first and second support members and engageable with the substantially horizontal support surface for supporting the first and second frame members above the substantially horizontal support surface;
    three first support members coupled to the first and second frame members, each support member including an upwardly facing bicycle support surface, the support surfaces including a steering stem area support surface directly engageable with the steering stem area of the bicycle, a seat post area support surface directly engageable with the seat post area of the bicycle, and a rear wheel area support surface directly engageable with the rear wheel area of the bicycle, the steering stem area support surface, the seat post area support surface, and the rear wheel area support surface cooperating to provide a horizontally oriented three-point bicycle support platform configured to support the bicycle in the substantially horizontal orientation while the bases support the first and second frame members; and
    at least one second support member coupled to one of the first and second frame members and configured for engagement with an end of the bicycle to support the bicycle in the substantially vertical orientation while the bases support the first and second frame members.

12. The bicycle rack of claim 11, wherein the at least one second support member includes a fork clamp.

13. The bicycle rack of claim 11, further comprising three support assemblies, each support assembly including a first coupling assembly coupling the support assembly to one of the first frame member and the second frame member, and a second coupling assembly adjustably coupling a respective one of the first support members to the support assembly.

14. The bicycle rack of claim 13, wherein each first coupling assembly selectively restricts and permits movement of its respective support assembly in a direction substantially parallel to a longitudinal extent of the respective first or second frame member, and wherein each second coupling assembly selectively restricts and permits movement of its respective first support member to adjust a height of the respective support surface.

15. The bicycle rack of claim 11, further comprising three support assemblies, each support assembly supporting a respective one of the three support members and including a respective one of the bases.

16. The bicycle rack of claim 15, wherein the at least one second support member is fixed to a respective one of the three support assemblies.

17. The bicycle rack of claim 11, wherein the at least one second support member is moveably coupled to the one of the first and second frame members to adjust a location of the at least one second support member along the one of the first and second frame members.

18. The bicycle rack of claim 11, wherein the second frame member is coupled to the first frame member for longitudinal movement along the first frame member and for pivotal movement about a substantially vertical axis.

19. A bicycle rack configured to support a bicycle in either a substantially horizontal orientation or in an upright, substantially vertical orientation, the bicycle rack comprising:

a first frame member defining a first axis;

a second frame member pivotally and slidably coupled to the first frame member and defining a second axis;

three support assemblies, two of the three support assemblies coupled to the first frame member and one of the three support assemblies coupled to the second frame member, each support assembly including a first coupling assembly slidably coupling the support assembly to its respective first or second frame member for movement along the respective first or second frame member, and a second coupling assembly;

three first support members, each first support member moveably coupled to a respective support assembly by a respective second coupling assembly, each first support member defining a generally upwardly facing bicycle support surface and being adjustable to vary a height of its respective bicycle support surface, the bicycle support surfaces cooperating to provide a horizontally-oriented three-point bicycle support platform configured to support the bicycle in the substantially horizontal orientation;

three second support members, each second support member fixed to a respective one of the three support assemblies and moveable therewith along the respective first or second frame member, each second support member including a releasable clamp member for supporting a bicycle in an upright, substantially vertical orientation.

20. The bicycle rack of claim 19, wherein each first support member includes a substantially X-shaped support platform that defines the respective bicycle support surface and that includes a plurality of attachment locations, each first support member further including an attachment member releasably securable to the attachment locations and configured to secure the bicycle to the respective first support member.

21. The bicycle rack of claim 19, wherein each support assembly includes a base, and wherein the bases cooperate to support the first and second frame members.

* * * * *